United States Patent [19]

Yang

[11] Patent Number: 5,849,425
[45] Date of Patent: Dec. 15, 1998

[54] METHOD FOR PRODUCING A RED-LUMINESCENCE FLUORESCENT MATERIAL WITH HIGH LUMINOUS EFFICIENCY

[75] Inventor: Youngsoo Yang, Puk-gu, Rep. of Korea

[73] Assignee: Samsung Display Devices Co., Ltd., Sin-dong, Rep. of Korea

[21] Appl. No.: 705,413

[22] Filed: Aug. 29, 1996

[30] Foreign Application Priority Data

Sep. 26, 1995 [KR] Rep. of Korea .................. 1995 31877

[51] Int. Cl.$^6$ ..................................................... H05B 33/14
[52] U.S. Cl. .................. 428/690; 428/917; 252/301.4 R; 252/301.6 S
[58] Field of Search ....................... 252/301.36, 301.4 R, 252/301.6 S; 428/690, 917

[56] References Cited

FOREIGN PATENT DOCUMENTS 72-2218779  10/1973  Germany .

*Primary Examiner*—Charles Nold
*Attorney, Agent, or Firm*—Christie, Parker & Hale, LLP

[57] ABSTRACT

The red-luminescence fluorescent material obtained by addition of a composite flux of potassium salt or sodium salt, has an excellent color production region and luminance simultaneously, and has excellent contrast.

3 Claims, No Drawings

METHOD FOR PRODUCING A RED-LUMINESCENCE FLUORESCENT MATERIAL WITH HIGH LUMINOUS EFFICIENCY

BACKGROUND OF THE INVENTION

1. Field of the Invention

The present invention relates to a method for producing a red-luminescence fluorescent material, and more particularly to a method for producing a red-luminescence fluorescent material that provides a high color purity and luminance of a fluorescent color using a composite flux.

2. Description of the Related Art

The use of a fluorescent material is for a light origin, an indicator and an inspector. The general use of the fluorescent material for a light origin is for a fluorescent lamp in which the ultraviolet rays of mercury vapor is converted into infrared rays by the fluorescent material.

The fluorescent material for a three wavelength lamp with a lot of color temperature is developed in accordance with the various requirements for illumination in the field of a fluorescent material for a fluorescent lamp. Because the fluorescent material for a three wavelength lamp has a higher color purity than conventional zinc-based white fluorescent materials, and has high color reproduction close to natural colors, it is substituted for a white fluorescent material.

Recently, as the quality of life has been improving and diversifying more and more, the high quality of illumination has been required and a lamp with high efficiency has been developed to improve color rendition.

As fluorescent materials using rare earth metal system and 1-base material-2-fluorescent material system have been realized, there has been a growing interest considering the economical aspect.

As an indicator, a fluorescent material based on rare earth metal for color TV has usually been used A red fluorescent material $YVO_4$:Eu for color TV accelerated the research for a fluorescent material.

In general, $Y_2O_2S$, $La_2O_2S$ and $Gs_{2O2}S$ etc., have been used as a red fluorescent material, and rare earth metals such as Eu, Tb, Sm, Ce and Pr, etc., have been used as activators. This rare earth metal-based fluorescent material has lower energy efficiency but higher luminous efficiency, for example, luminance, contrast and color reproduction other than fluorescent materials.

However, as the size of color TV screens and the quality demand is increases, the amount of an activator is increased to improve luminous efficiency.

However, the region of fluorescent color reproduction is increased with an addition of an activator and the luminance is decreased reversely. In addition, because $Eu^{+++}$ usually used is expensive, samarium(Sm) is used instead of it. Hitachi Co. has researched the substitution effect for a red fluorescent material $Y_2O_2S$: Eu. It reported that the substitution of Eu by Sm causes color to increase production region without reduction of luminance and color.

In the meantime, while the reduced amount of Eu is 0.2%, the total amount of $Y_2O_2S$:Eu is large, therefore the result can be obtained by the accumulation effect for a long period.

SUMMARY OF THE INVENTION

To overcome the problems of the conventional red-luminescence fluorescent material using $Eu^{+++}$ as an activator, it is an object of the present invention to provide a red-luminescence fluorescent material which has an excellent color production region, luminance and contrast at the same time.

To achieve the objective of the present invention, this invention provides a method for producing a red-luminescence fluorescent material comprising the steps of adding a composite flux to a fluorescent material composition including a base material $Y_2O_3$, an activator $Eu_2O_3$ and sulfur, calcinating said fluorescent material composition and pulverizing the calcinated fluorescent material composition, washing and drying, and the composite flux is a mixture of at least two salts and said salt is selected from the group consisting of potassium salts and sodium salts.

The composite flux preferred is selected from the group consisting of $KNO_3$—$NaNO_3$, $Na_2CO_3$—$NaNO_3$, $NaCO_3$—$KNO_3$, $KNO_3$—$K_2HPO_4$—$Na_2CO_3$—$NaNO_3$ and $K_2HPO_4$—$KNO_3$.

In addition, an amount of the composite flux is 10–50 weight % of $KNO_3$, 10–50 weight % of $NaNO_3$, 30–70 weight % of $Na_2CO_3$ and 5–35 weight % of $K_2HPO_4$, based on said base material $Y_2O_3$.

Moreover, this invention provides a red-luminescence fluorescent material comprising a base material $Y_2O_2S$, an activator $Eu_2O_3$ and a composite flux, which is a mixture of at least two and the salt is selected from the group consisting of potassium salts and sodium salts.

The composite flux is preferred to selected from the group consisting of $KNO_3$—$NaNO_3$, $Na_2CO_3$—$NaNO_3$, $NaCO_3$—$KNO_3$, $KNO_3$—$K_2HPO_4$—$Na_2CO_3$—$NaNO_3$ and $K_2HPO_4$—$KNO_3$.

In addition, an amount of the composite flux is 10–50 weight % of $KNO_3$, 10–50 weight % of $NaNO_3$, 30–70 weight of $Na_2CO_3$ and 5–35 weight % of $K_2HPO_4$, based on said base material $Y_2O_3$.

The present invention will now be described more specifically with reference to the preferred embodiments described below only by way of example.

EXAMPLE

Example 1

25 weight % of $KNO_3$ and 25 weight % of $NaNO_3$ as 35 weight % of the composite flux S, were added to a fluorescent material composition consisting of $Y_3O_3$100 weight % and $Eu_2O_3$4.0 weight % in the form of a powder. The elevation velocity of temperature in each step was 5° C./min.

The above composition was maintained in 6 steps of 200°, 400°, 600°, 950°, 1150°, 1300° C. for 5 minutes, respectively, and then the temperature was elevated to the final temperature of 1300° C. The composition was calcinated in an oxidation atmosphere at 1300° C. for 3 hours, pulverized with a glass ballmill for the fluorescent material to have diameter of 5–10 $\mu$m, and washed and dried at 110° C. for 24 hours, to manufacture a red-luminescence fluorescent material.

Example 2

A red-luminescence fluorescent material was manufactured by carrying Example 1 except for 35 weight % of $Na_2CO_3$ and 30 weight % of $NaNO_3$ as a composite flux.

Example 3

A red-luminescence fluorescent material was manufactured by carrying Example 1 except for 60 weight % of $Na_2CO_3$ and 45 weight % of $KNO_3$ as a composite flux.

Example 4

A red-luminescence fluorescent material was manufactured by carrying Example 1 except for 45 weight % of $KNO_3$, 10 weight % of $K_2HPO_4$, 55 weight % of $Na_2CO_3$ and 20 weight % of $NaNO_3$ as a composite flux.

Example 5

A red-luminescence fluorescent material was manufactured by carrying Example 1 except for 30 weight % of $K_2HPO_4$ and 15 weight % of $KNO_3$ as a composite flux.

Comparative Example 96 weight % of $Y_2O_3$, 4 weight % of $Eu_2O_3$, 35 weight % of S and 55 weight % of $Na_2CO_3$ were mixed for 3 hours and calcinated for 3 hours at 1300° C. The mixture was washed, dried and pulverized with a glass ballmill. It was washed and dried again to obtain a red-luminescence fluorescent material. The method for measuring property is as follows:

1. Color coordinate

The color coordinate of red-luminescence fluorescent materials manufactured in Example 1 to Example 5 the Comparative Example were mounted in demountable tubes which are able to be mounted and demounted for a conventional fluorescent lamp. The pressure was below $10^{-7}$ torr, the current was below 15 mA and the voltage was below 15 kV.

2. Luminance

The luminance was measured by carrying the above method for a color coordinate.

TABLE

The luminescence properties of red-luminescence fluorescent material

| | color designation (x coordinate) | relative luminance (%) |
|---|---|---|
| Example 1 | 0.648 | 125 |
| Example 2 | 0.634 | 128 |
| Example 3 | 0.635 | 129 |
| Example 4 | 0.643 | 126 |
| Example 5 | 0.641 | 124 |
| Comparative Example | 0.617 | 108 |

As indicated in the above table, the red-luminescence fluorescent material according to the invention has excellent properties of color production region and luminance, which are expressed as the characteristics of a fluorescent material, comparative with the conventional fluorescent material which uses a single flux of potassium salt or sodium salt.

What is claimed is:

1. A method for producing a red-luminescence fluorescent material comprising the steps of:

adding a composite flux comprising at least two salts selected from the group consisting of potassium salts and sodium salts to a fluorescent material composition comprising a base material $Y_2O_3$, an activator $Eu_2O_3$ and sulfur;

calcinating said fluorescent material composition;

pulverizing the calcinated fluorescent material composition; and washing and drying the pulverized calcinated fluorescent material.

2. The method of claim 1, wherein said composite flux is selected from the group consisting of $KNO_3$—$NaNO_3$, $Na_2CO_3$—$NaNO_3$, $NaCO_3$—$KNO_3$, $KNO_3$—$K_2HPO_4$—$Na_2CO_3$—$NaNO_3$ and $K_2HPO_4$—$KNO_3$.

3. The method of claim 1, wherein an amount of said composite flux is 10–50 weight % of $KNO_3$, 10–50 weight % of $NaNO_3$, 30–70 weight % of $Na_2CO_3$ and 5–35 weight % of $K_2HPO_4$, based on said base material $Y_2O_3$.

* * * * *

UNITED STATES PATENT AND TRADEMARK OFFICE
CERTIFICATE OF CORRECTION

PATENT NO. : 5,849,425
DATED : December 15, 1998
INVENTOR(S) : Youngsoo Yang

It is certified that error appears in the above-identified patent and that said Letters Patent is hereby corrected as shown below:

Column 1, line 39, after "been used" insert a period.
Column 1, line 42, replace "$Gs_{2O2}S$" with -- $Gs_2O_2S$ --.
Column 1, line 50, after "demand" delete "is".
Column 2, line 28, replace "flux is preferred to selected" with
 -- flux preferred is selected --.
Column 2, line 34, replace "weight of $Na_2CO_3$" with
 -- weight % of $Na_2CO_3$ --.
Column 3, line 23, after "Example 5" insert -- in --.

Signed and Sealed this

Tenth Day of October, 2000

Attest:

Q. TODD DICKINSON

*Attesting Officer*  *Director of Patents and Trademarks*